Figure 1:
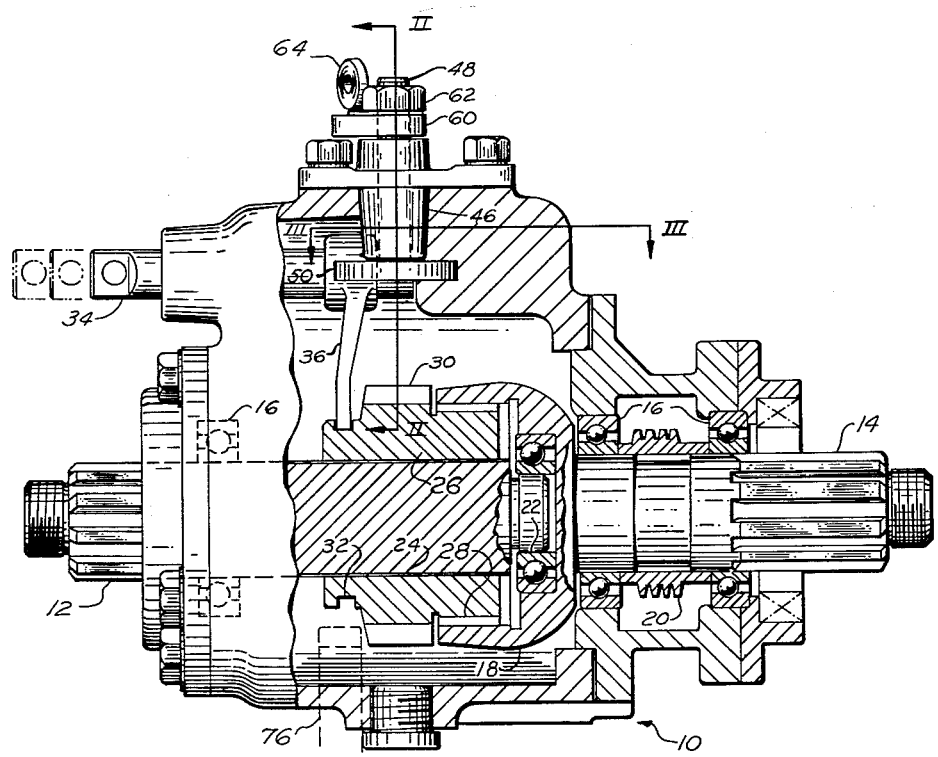

Nov. 22, 1960  R. W. WAGNER  2,960,880
POWER TAKE OFF

Filed July 3, 1957  3 Sheets-Sheet 1

INVENTOR
ROBERT W. WAGNER

BY *Thomsen A Beaman*
ATTORNEY

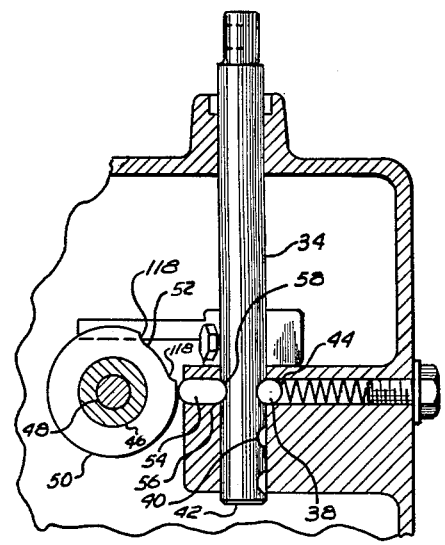
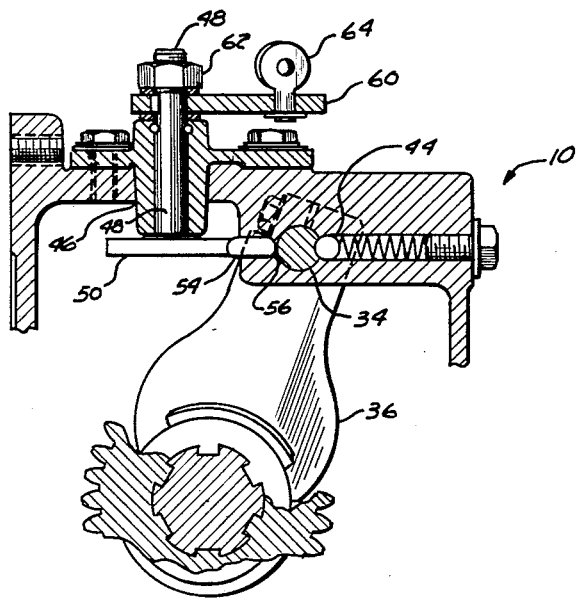

Nov. 22, 1960   R. W. WAGNER   2,960,880
POWER TAKE OFF

Filed July 3, 1957   3 Sheets-Sheet 3

INVENTOR
ROBERT W. WAGNER

BY Lawrence F. Beaman

ATTORNEY

United States Patent Office 2,960,880
Patented Nov. 22, 1960

2,960,880

POWER TAKE OFF

Robert W. Wagner, Chelsea, Mich., assignor to Dana Corporation, Toledo, Ohio, a corporation of Virginia Filed July 3, 1957, Ser. No. 669,837

5 Claims. (Cl. 74—15.86)

The invention relates to a power take off unit for use with a vehicle and particularly to irreversable power take off driven by a reversable drive gear.

Normally, a power take off unit for use with vehicles is attached to the transmission housing and is driven from the transmission input shaft which will always be rotating in the same direction irrespective of the direction of rotation of the transmission output shaft. Thus, unidirectional rotation of the power take off output shaft is readily obtained, as is necessary in that pumps, winches, and other auxiliary equipment driven from the power take off will operate properly only when driven in a single direction. Auxiliary equipment may be operated at all times irrespective of vehicle speed and direction with the above construction.

However, the arrangement and design of some transmissions, especially those of the automatic type, preclude attachment to the transmission input shaft and therefore it is necessary to drive the power take off from the output shaft if auxiliary equipment is to be used with the vehicle. As will be apparent from the previous paragraph, difficulties arise when the power take off is driven from the transmission output shaft in that the power take off will be driven backward when the vehicle is put in reverse and driven too fast when the vehicle is traveling at higher speeds.

To alleviate these problems arising from driving the power take off unit from the transmission output shaft it is proposed to utilize a shiftable interlock in the transmission output power train from which the power take off is driven permitting the take off to be engaged only at the lower road speeds, disconnected at the higher road speeds and also engageable when the vehicle is stationary. To prevent the direction of power take off rotation from changing when the transmission output shaft reverses rotation the invention contemplates the use of unidirectional drive members within the power take off unit.

It is thus an object of the invention to provide a power take off drive unit interlock which permits the power take off to be driven from a transmission output shaft.

A further object of the invention is to provide a power take off drive unit interlock driven from a transmission output shaft which may selectively engage the power take off alone, engage the power take off and main drive shaft simultaneously, or disengage the power take off and engage the main drive shaft alone.

Another object of the invention is to provide a unidirectional power take off driven from a reversable drive means which automatically produces the proper direction of rotation irrespective of the direction of drive means rotation.

Yet another object of the invention is to produce a power take off unit utilizing one way clutch means to provide unidirectional rotation and a readily changeable power take off output shaft whereby the power take off shaft may be selectively assembled within the take off housing.

Figure 6:
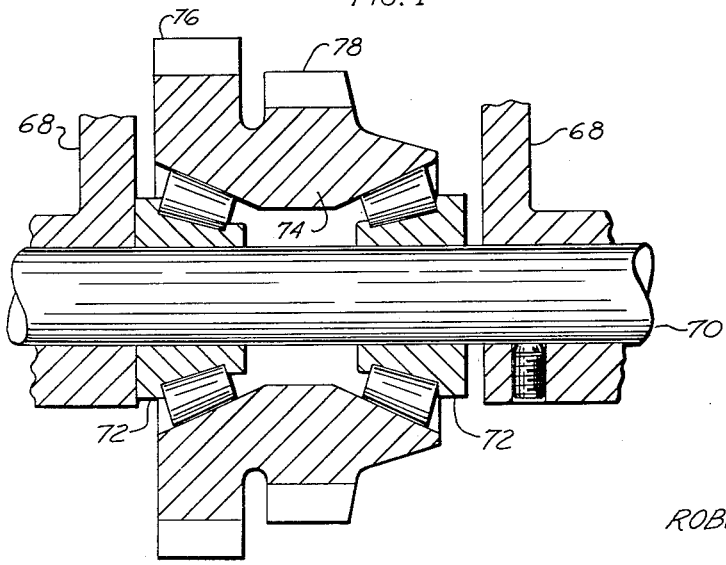
Figure 4:
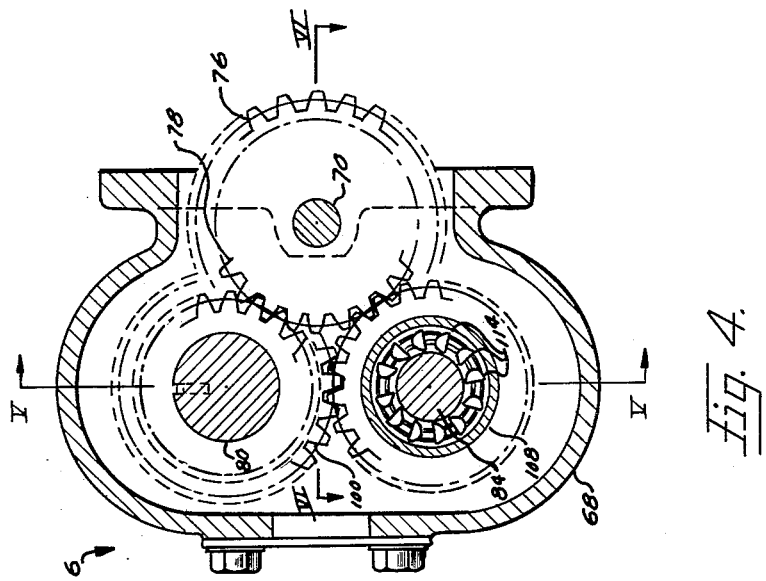
Figure 5:
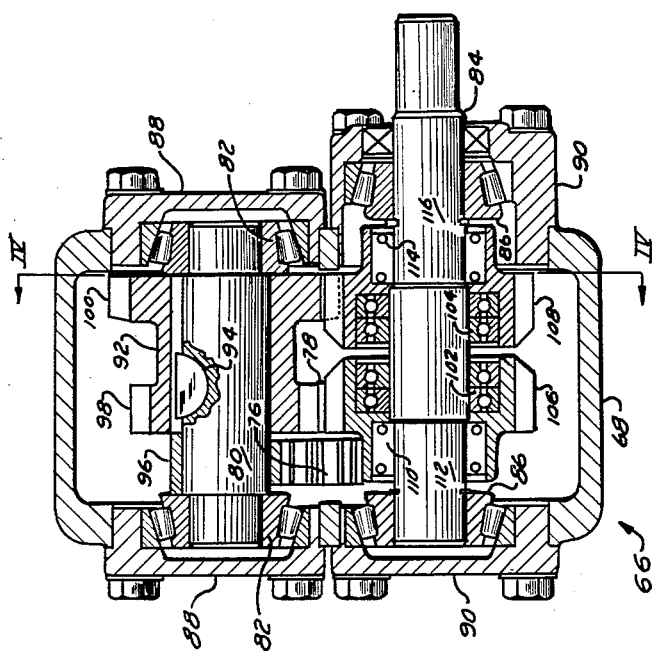

These and other objects of the invention will become apparent from the following specification and drawings wherein:

Fig. 1 is a cross-sectional elevation of the power take off drive unit used with the invention, Fig. 2 is a cross section of the interlock taken along the line II—II of Fig. 1, Fig. 3 is a cross-section plan view of the interlock taken along the line III—III of Fig. 1, Fig. 4 is a cross-sectional end view of the power take off, before assembled to the drive unit, taken along the line IV—IV of Fig. 5, Fig. 5 is a cross-sectional elevation of the power take off taken along the line V—V of Fig. 4, and Fig. 6 is a cross-sectional view of the power take off drive gears taken along the line VI—VI of Fig. 4.

The power take off drive unit 10 is interposed in the power train between the vehicle transmission and the differential. Usually the drive unit 10 will be located immediately behind the transmission whereby the splined drive unit input shaft 12 may be connected to the output shaft, not shown, of the transmission. As seen in Fig. 1 the drive unit 10 is provided with the coaxial input shaft 12 and output shaft 14 which are rotatably journaled within unit 10 by the antifriction bearings 16. The output shaft is connected to the vehicle propeller shaft and ultimately powers the vehicle differential. The output shaft 14 is provided with an internally splined bell 18 and the speedometer gear may be located at 20. A bearing 22 is located within bell 18 and serves to support the inner end of input shaft 12 which is journaled therein.

The shaft 12 is splined at 24 and an internally splined gear 26 is slidingly supported thereon for rotation with the shaft. The gear 26 is composed of three portions, namely, spline teeth 28 which may engage the spline of bell 18, the gear teeth 28 which may engage the spline of bell 18, the gear teeth 30 and the annular groove 32 which cooperate with a shifting arm to axially position the gear 26 on shaft 12 as will later be described.

The interlock and mechanism for shifting the gear 26 is located at the top of the drive unit 10 as shown in Fig. 1 and consists of an axially slidable shifter rod 34 on which the arm 36 is affixed. The arm 36 is provided with an arcuate concave tip adapted to engage the groove 32 of gear 26. Thus, axial movement of rod 34 will cause the gear 26 to slide on the shaft 12. As there are three operating positions of the gear 26, as will be later explained, three indentations 38, 40 and 42 are provided on the shifter rod 34 for cooperation with a spring biased ball detent 44 as shown in Figs. 2 and 3 thereby locking the rod 34 and the gear 26 in the desired position.

The safety interlock which prevents the power take off from being engaged except when the vehicle transmission is in a low speed range, either forward or reverse, is bolted to the housing of the drive unit 10 and consists of a base member 46 in which the shaft 48 is rotatably supported. A key 50 is affixed to the lower end of shaft 48 and rotates therewith, as disclosed in Fig. 3 the key 50 is of circular configuration except for a portion 52 which is cut back from the periphery. A plunger 54 is supported for axial reciprocation within a bore 56 which is formed in the drive unit structure supporting shifter rod 34. The plunger 54 contacts the periphery of key 50 at one end and the rod 34 at the other end, rod 34 is provided with a recess 58 into which plunger 54 may be inserted upon alignment of recess 58 with the bore 56. An actuating lever 60 is affixed to shaft 48 by the nut 62 and is provided with an eye 64 for connection with the transmission shifting linkage, as will be later described.

The power take off unit 66 is shown in Figs. 4 and 5 and consists of a housing 68 which is bolted to the drive unit 10. A shaft 70 (Fig. 6) is supported within housing 68 and serves to carry the bearings 72 which are of the roller type and rotatably journal the gear hub 74. A large drive gear 76 and a smaller gear 78 are formed integrally on the hub 74 and it is the purpose of the gear 76 to project into the drive unit 10 for selective engagement with the sliding gear 26 and the teeth 30 thereof.

The housing 68 contains a pair of rotatable shafts to convert the reversable rotation of the gears 76 and 78 into a non-reversable power take off output. As observed in Fig. 5, the shaft 80 is rotatably supported by anti-friction bearings 82 and the power take off output shaft 84 is journaled in the bearings 86. The bearings 82 and 86 are in turn affixed to the housing 68 by means of eccentric bearing caps 88 and 90 respectively. The bores within housing 68 receiving the bearing caps are all of the same diameter permitting the bearings caps to be interchangeable thereby enabling the power take off to be assembled in various positional relationships to suit the particular vehicle application, as will be later explained.

A gear hub 92 is keyed, at 94, to the shaft 80 for rotation therewith and positioned by the spacer 96. Hub 92 is formed with the gear teeth 98, which mesh with gear 78, and the gear teeth 100.

A pair of bearings 102 and 104 are press fitted to the output shaft 84 intermediate the bearings 86, and function to journal the gears 106 and 108, respectively, about the shaft 84. The gear 106 is located to mesh with the gear 78 while the gear 108 engages the teeth 100 of gear hub 92. The hub of gear 106 is axially extended to provide for the one way clutch 110 which is carried by gear 106 and engages the shaft 84 at the reduced diameter portion 112. The gear 108 is provided with a similar one way clutch 114 which engages the portion 116 of shaft 84. The clutches 110 and 114 may be of any conventional type which operates automatically with a minimum of backlash and the clutches illustrated in Figs. 4 and 5 are by way of illustration and example only.

One end of the power take off output shaft 84 protrudes from the housing 68 and is keyed for provision of pulleys, sheaves or other means for transferring the rotative power of shaft 84 to the auxiliary equipment.

It will thus be understood that the power take off housing fastens to the drive unit 10 such that the gear 76 may mesh with teeth 30; the gear 78, formed integral with gear 76, will mesh with both gears 98 and 106; and the gear teeth 100 will mesh with the drive the gear 108.

The operation of the device is as follows:

As stated above, the drive unit 10 is powered from the vehicle transmission, thus when the transmission is in any position except neutral the input shaft 12 will be rotating. The shifter rod 34 is connected by suitable remote control means to an actuating handle operable by the vehicle operator. A linkage (not shown), connected to the vehicle transmission shift lever system is attached to the eye 64 of lever 60 such that the shaft 48 will be rotated as the transmission shift lever is actuated.

To engage the power take off the operator will actuate the handle shifting rod 34 such that gear 26 (Fig. 1) will be moved by the arm 36 to either the left most position on shaft 12 or the intermediate position. In each of these positions the gear teeth 30 will mesh with the gear 76 and drive the power take off 66. The detent 44 engages indent 42 when gear 26 is at the left position, maintaining the selection, indent 40 holds gear 26 in the intermediate position and when gear 26 is shifted to the far right the indent 38 will be engaged by detent 44 as shown in Fig. 3. It will be observed from Fig. 1 that the teeth 30 and spline teeth 28 of gear 26 are of such width and position that when the gear 26 is in the left position gear 76 and teeth 30 will be in mesh and the spline teeth 28 are removed from the internal spline of bell 18; when the gear 26 is in the intermediate position the gear 76 and teeth will still be engaged sufficiently to drive the power take off unit and the spline teeth 28 will mesh with the splines of bell 18 driving the output shaft 14; and when the gear 26 is in the right most position (Fig. 1) the gear 76 is disengaged completely and the spline teeth 26 fully engage the spline of bell 18 transmitting all the power of input shaft 12 directly to output shaft 14.

Inasmuch as the vehicle transmission will rotate the input shaft 12 at higher speeds than should be transmitted to the power take off unit 66 when the vehicle is traveling at the higher road speeds the interlock is provided to prevent damage to the take off unit or auxiliary equipment powered therefrom. The interlocking action is achieved by the key 50 and plunger 54. As mentioned above, the shaft 48 will be rotated whenever the transmission shift lever is actuated to change the vehicle direction or gear ratio and thus the key 50 will be positioned relative to the transmission gear selection. When the vehicle transmission is shifted into any gear other than neutral, low speed or reverse, the key 50 will be positioned such that plunger 54 will contact the maximum diameter of the key. When the plunger is contacting the maximum diameter of key 50 the recess 58 of shifter rod 34 must be aligned with bore 56 to enable the plunger 54 to drop into recess 58 and as recess 58 will align with bore 56 only when the rod 34 and gear 26 are in the position disengaging teeth 30 from gear 76 the power take off will be rendered inactive.

When it is desired to use the power take off the vehicle transmission must be shifted to low speed or reverse which will rotate key 50 to align the recessed portion 52 with the bore 56 permitting the plunger 54 to be displaced from the recess 58 upon axial reciprocation of rod 34. The rod 34 and gear 26 may now be positioned to either engage the gear 76 alone or gear 76 and bell 18 if it is desired to power the auxiliary equipment while the vehicle is moving in low gear forward or reverse. Should the operator attempt to shift the transmission into a higher speed ratio while the power take off is engaged, the tapered shoulder 118 of key 50 will contact the plunger 54 and attempt to push plunger 54 toward rod 34, however, this movement will be restrained until rod 34 is shifted to disengage the gears 26 and 76 aligning bore 56 and recess 58 and rendering the power take off inoperative. Thus, the vehicle transmission may not be shifted to a higher gear ratio until the power take off is disengaged.

It will be apparent that since the power take off may be engaged when the vehicle transmission is in low speed forward or reverse the gear 76 may be driven in either direction, however, it is important that the power take off output shaft 84 always be driven in the same direction as most auxiliary equipment driven from the power take off operates properly only when driven in the proper direction. Unidirectional rotation of shaft 84 is provided by the alternate driving of gears 106 and 108 through one-way clutches 110 and 114. The gears 92 and 106 both mesh with, and are driven by the small gear 78, which is integral with drive gear 76, thus gears 106 and 92 will rotate in the same direction. As the gear 108 is driven by gear 92 through teeth 100 the gear 108 will be rotated in a direction opposite that of gear 92 and gear 106. Since clutch 110 is driven by gear 106 and clutch 114 by gear 108 the clutches will also be rotating in opposite directions, thus the shaft 84 will be always driven by one of the clutches 110 or 114 while the other clutch is disengaged. For instance, as the clutches 110 and 114 will only engage drive shaft 84 when being rotated in one direction the clutches are arranged such that the clutch rotating in the proper direction is the one which is driving shaft 84. Thus, irrespective of the direction of rotation of gears 76 and 78 one of the clutches 110 or 114 will always be rotating in the proper direction and this clutch will automatically engage and drive shaft 84. Ratios of gears 98, 100, 106 and 108 are such that clutches 106 and 108 will rotate at the same speed, although in opposite directions.

Some applications of the power take off unit 66 may require that the keyed end of shaft 84 extend from the left of housing 68, rather than the right, as shown in Fig. 5. This modification may be easily accomplished since the bearing caps 90 are interchangeable and the gears 106 and 108 of the same size.

It is thus apparent that the invention discloses a power take off unit which may be used with transmissions which do not permit the unit to be directly attached to the transmission; the auxiliary equipment driven by the take off is protected against damage by an automatic safety interlock which prevents the power take off from being engaged when the vehicle transmission is rotating at high speeds or prevents shifting the transmission into high speeds when the power take off is engaged; and the auxiliary equipment will always be driven in the proper direction irrespective of the direction of trans mission rotation since the power take off output shaft rotation is unidirectional.

Although a single embodiment of the invention has been described and illustrated, it is to be understood that the invention is in no way limited thereby and that various changes and modifications may be made therein without departing from the spirit and scope of the invention.

I claim:

1. A drive unit for use with a power take off comprising a housing, an input shaft journaled in said housing, an output shaft journaled in said housing coaxially with said input shaft, a gear axially positionable upon said input shaft and keyed thereto, a shifter rod slidably supported within said housing, an arm affixed to said rod and engaging said gear for the positioning thereof, a key rotatable about a fixed axis and having a periphery of various radial dimension from said axis journaled in said housing adjacent said rod, a recess formed in said rod, an axially slidable plunger supported in said housing operably engaging the periphery of said key and adapted to seat in said recess at a predetermined axial location of said rod and engagable means formed on said gear and said output shaft whereby said input and output shafts may be drivingly connected.

2. A power take off assembly for use with a multi-speed transmission comprising a housing, an input shaft journaled in said housing, a main output shaft journaled in said housing coaxially with said input shaft, a slidable gear positionable on said input shaft and keyed thereto, means formed on said slidable gear and said main output shaft for selective driving connection, a shifter rod axially slidably supported by said housing, an arm carried by said rod adapted to position said slidable gear on said input shaft, a drive gear positioned for selective engagement by said slidable gear, a rotatably mounted power take off output shaft, first and second gears rotatably mounted on said power take off output shaft, one-way clutches carried by said first and second gears engaging said take off output shaft for rotating said shaft unidirectionally, a third gear in effective engagement with said drive gear and said second gear, said first gear being in effective driven engagement with said drive gear, a detent engaging indentation formed in said shifter rod for locking said rod in a predetermined position and interlock means regulating operation of said shifter rod.

3. In a power take off assembly as in claim 2 wherein said interlock means comprises a contoured key rotatably journaled in said housing, a recess formed in said rod and a plunger axially reciprocable within a bore in said housing whereby said plunger engages the contoured portion of said key and upon alignment of said plunger and recess rotation of said key will cause said plunger to engage said recess preventing movement of said rod.

4. A power take off unit comprising a housing, first and second sets of eccentric, interchangeable bearing caps adjustably affixed to said housing, anti-friction bearings mounted within each of said bearing caps, an output shaft journaled in the bearings of said first set of caps, a second shaft journaled in the bearings of said second set of caps parallel to said output shaft, first and second gears journaled on said output shaft coaxial thereto on anti-friction bearings, one way clutch means carried by said first and second gears in driving engagement with said output shaft, each of said clutch means adapted to rotate said output shaft in the same direction, a third gear having first and second sets of teeth keyed to said second shaft, said second set of teeth and said second gear meshing in driving engagement, a drive gear journaled in said housing, and a fourth gear formed integrally with said drive gear, said fourth gear meshing in driving engagement with said first gear and said first set of teeth whereby said first and second gears will rotate in opposite directions.

5. In combination with a variable speed transmission operated off a shift linkage, a power take off drive unit comprising a housing, an input shaft driven by the drive shaft of said transmission journaled in said housing, an output shaft journaled in said housing coaxially with said input shaft, a gear slidably mounted on said input shaft and keyed thereto, engageable means carried by said gear and said output shaft whereby said output shaft may be drivingly connected to said input shaft, an axially reciprocable shifter rod mounted in said housing, an arm affixed to said rod engaging said gear whereby reciprocation of said rod positions said gear upon said input shaft and an interlock means mounted in said housing actuated by the transmission shift linkage preventing changing of the gear position except in predetermined transmission speed ranges, said interlock means comprising a recess defined in said shifter rod, an axially reciprocable plunger supported in said housing engageable with said recess at a given position of said rod and a rotatable key operatively associated with the transmission shift linkage adapted to move said plunger toward said recess at predetermined positions of the transmission shift linkage.

References Cited in the file of this patent

UNITED STATES PATENTS

| 1,031,836 | Cameron | July 9, 1912 |
| 1,253,670 | Church | Jan. 15, 1918 |
| 1,454,576 | Clements | May 8, 1923 |
| 1,491,283 | Alspaugh | Apr. 22, 1924 |
| 2,232,992 | Alexander | Feb. 25, 1941 |
| 2,280,641 | Snow | Apr. 21, 1942 |
| 2,284,191 | Fishburn | May 26, 1942 |
| 2,316,503 | Curtis | Apr. 13, 1943 |
| 2,363,979 | Land et al. | Nov. 28, 1944 |
| 2,600,912 | Olson | June 17, 1952 |
| 2,661,634 | Beckman et al. | Dec. 8, 1953 |
| 2,661,935 | Willard | Dec. 8, 1953 |
| 2,847,871 | Schick | Aug. 19, 1958 |

FOREIGN PATENTS

| 170,540 | Switzerland | July 15, 1934 |